United States Patent Office 3,425,102
Patented Feb. 4, 1969

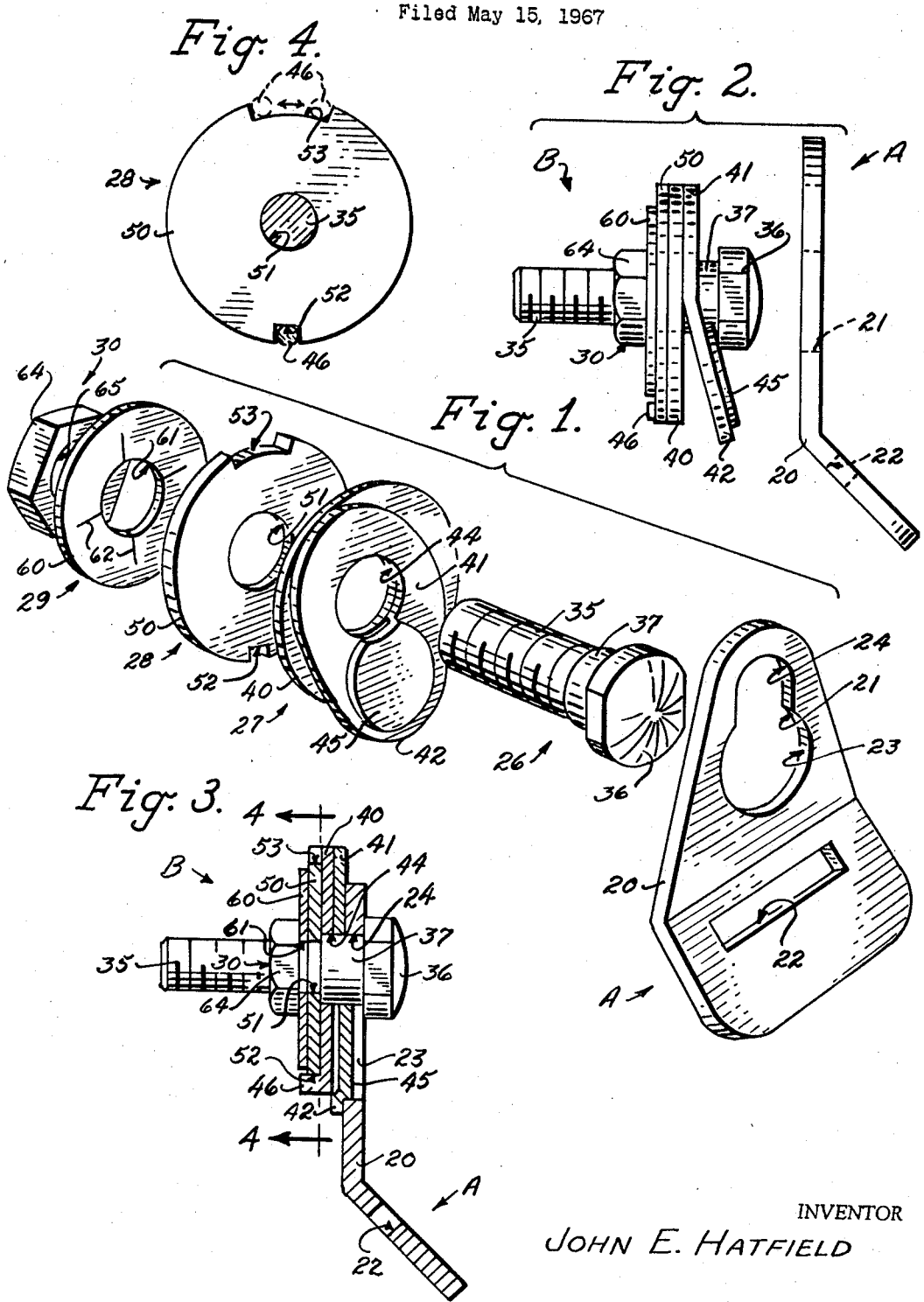

3,425,102
ANCHORING DEVICE
John Edward Hatfield, Stotfold, England, assignor to Irvin Industries Inc., a corporation of New York
Filed May 15, 1967, Ser. No. 638,548
Claims priority, application Great Britain, Jan. 4, 1967, 579/67
U.S. Cl. 24—224
Int. Cl. B60r 21/10
4 Claims

ABSTRACT OF THE DISCLOSURE

An anchoring device for removable attachment of an attaching plate to a bolt-like member. The plate is provided with a keyhole slot; the head of the bolt-like member is aligned with and passed through the larger part of the keyhole slot; the bolt-like member is registered with the narrower part of the keyhole slot for anchoring the plate; and a leaf spring member is provided for locking the plate in an anchored position. There may be included means for preventing or limiting rotational movement of the attaching plate about the bolt-like member.

---

This invention relates to improvements in detachable anchoring devices similar to those provided in the copending application of Joseph R. C. Lane, Ser. No. 604,913, filed Dec. 27, 1966, now Patent No. 3,392,427.

As set forth in the aforementioned application Ser. No. 604,913, anchoring devices of this type are primarily provided for attaching seat belts to motor vehicles and permit facile interconnection of the attaching plates of seat belts in a positively locked manner which prevents unwanted loosening of the attaching plate of the seat belt from its anchored position. The primary object of the present invention is the provision of an improved spring and locking member which are integral and provide effective and compact construction.

A further object is the provision of an improved anchoring device for the removable attachment of an attaching plate which includes means for selectively preventing rotation of the attaching plate with respect to the anchoring device, or providing only limited rotation of the attaching plate with respect to the anchoring device.

A further object is the provision of an improved anchoring device having means for maintaining the same in an assembled relation prior to attachment to the anchorage point of a vehicle.

Other objects and advantages of the invention will be apparent during the course of the following detailed description, taken in connection with the accompanying drawing, forming a portion of this specification, and in which drawing:

FIG. 1 is an exploded perspective view of the various elements of any invention.

FIG. 2 is a side view showing my improved anchoring device with the attaching plate about to be secured to the attaching means.

FIG. 3 is a view similar to FIG. 2 and showing the attaching plate anchored to the attaching means.

FIG. 4 is a sectional view taken substantially along the line 4—4 of FIG. 3.

In the drawing, wherein for the purpose of illustration is shown a preferred embodiment of the invention, and wherein similar reference characters designate corresponding parts throughout the several views, the latter A may generally designate an attaching plate and B attaching means to which attaching plate A may be removably anchored.

As shown in the drawing, attaching plate A may comprise an elongated plate 20 which is provided at one end thereof with a keyhole slot 21 and at the other end thereof with an elongated slot 22. Keyhole slot 21 has a larger part 23 and a narrower part 24, as is conventional in keyhole slots in which an attaching member is inserted into the slot through larger part 23 and is registered with narrower part 24 for interconnection of the same to an attaching means. The attaching plate shown in the drawing is of the type to which a seat belt strap may be interconnected through elongated slot 22.

It is, of course, to be understood that this invention is not limited to the provision of removable attachments for seat belts, and that attaching plate A may be a part of some other type of fastener or device.

Attaching means B preferably includes bolt-like means 26; locking means 27; guide washer 28; locking washer 29; and nut 30.

Bolt-like means 26 preferably comprises an elongated threaded shank 35 having a head member 36 at one end thereof and including spacing means 37 adjacent head member 36. In the preferred form, head member 36 and spacing means 37 are integral and are formed integral with threaded shank 35. In this way, the various parts of the attaching means are held to a minimum, permitting ready assemblage of the same. Spacing means 37 could, however, comprise a sleeve or elongated washer removably received on threaded shank 35. Spacing means 37 is of a peripheral size and shape to be readily received within narrower part 24 of keyhole slot 21.

Locking means 27 preferably includes a substantially flat circular resilient portion 40 and an integral elongated resilient portion 41. Locking means 27 may be formed as a one-piece construction of molded plastic, or portions 40 and 41 may be separately formed and cemented together at one end.

Portion 41 of locking means 27 comprises a leaf spring having a biased end 42 divergently angled from portion 40, extending in a cantilevered manner from circular portion 40. An opening 44 is provided through each portion 40 and 41 for mounting the same on spacing means 37. A projection 45 is provided on biased end 42 of leaf spring 41 in juxtaposition for interfitting within the larger part 23 of keyhole slot 21, as will be subsequently described. A lug 46 is provided on the face of circular portion 40 which is adjacent guide washer 28 for a purpose as will be subsequently described.

Projection 45 has a semi-circular exterior periphery which substantially conforms to the internal diameter of larger part 23 of keyhole slot 21.

Guide washer 28 preferably comprises a cylindrical body portion 50 having a central aperture 51 which may be received on spacing means 37. Guide washer 28 is preferably provided with a pair of peripheral recesses 52 and 53. Recesses 52 and 53 provided guideways for receiving lug 46 of locking member 27, as will be subsequently described. Locking washer 29 preferably comprises a circular body portion 60 of thin synthetic resin having a central aperture 61 which is slightly smaller than the outer diameter of threaded shank 35. Thus, in order to mount locking washer 29 on threaded shank 35, aperture 61 must be slightly extended, which is effected through slots 62, providing a thread shank receiving portion which cooperates with threaded shank 35 in retaining locking means 27 and guide washer 28 on spacing means 37.

Nut 30 is conventional, having wrench receiving faces 64 and a threaded central aperture 65 which may be received on threaded shank 35 of bolt-like means 26.

Attaching means B is assembled as shown in FIG. 2, locking means 27 being mounted on spacing means 37 by passing of spacing means 37 through central aperture 44 thereof; guide washer 28 also being mounted on spacing means 37 by passage of spacing means 37 through central aperture 51 thereof; locking washer 29 being received on and cooperating with threaded shank 35 by passage of threaded shank 35 through central aperture 61 thereof; and nut 30 is threadedly attached to threaded shank 35 for maintaining the assembled attaching means.

When the attaching means is attached as shown in FIG. 2, locking means 27 is mounted on spacing means 37 and positioned between guide washer 28 and head 36 in juxtaposition so that one end of leaf spring 41 is fixed and spring biased end 42 thereof extends outwardly in a cantilevered manner.

The threaded end of shank 35 which extends beyond nut 30, as shown in FIGS. 2 and 3, is provided for suitable interconnection of the attaching means to an anchoring point such as the frame of a car.

In the assembled relation, as shown in FIGS. 2 and 3, lug 46 of locking means 27 is shown as positioned in guideway 52 of guide washer 28. When anchoring plate A is attached thereto in this position, anchoring plate A will not be rotatable with respect to attaching means B.

As shown in dotted lines in the upper portion of FIG. 4, when lug 46 is positioned within guideway 53, limited rotation of anchoring plate A is permitted.

In order to engage attaching plate A with attaching means B, larger part 23 of keyhole slot 21 is aligned with head 36 of bolt-like member 26 and anchoring plate A is pushed over head 36, displacing the biased end 42 of leaf spring 41 and attaching plate A is slipped over spacing means 37 and then moved (downwardly in the drawing) so that spacing means 37 is registered within narrower part 24 of keyhole slot 21, to a position as shown in FIG. 3. In this position, the undersurface of head 36 will be in abutment with the area of plate 20 which surrounds narrower part 24 of keyhole slot 21. When narrower part 24 of keyhole slot 21 is thus registered with bolt-like member 26, leaf spring 41 is loaded and urges projection 45 to interfitting engagement within larger part 23 of keyhole slot 21. In this position, attaching plate A is firmly secured to attaching means B and cannot be removed therefrom unless spring biased end 42 of leaf spring 41 is depressed. There is thus no danger of attaching plate A shaking loose from attaching means B, such as by the usual vibrations of vehicular driving.

In order to detach attaching plate A from attaching means B, spring biased end 42 of leaf spring 41 is depressed, by hand, until projection 45 is entirely out of larger part 23 of keyhole slot 21, whereupon attaching plate A can be slid to a position where larger part 23 of keyhole slot 21 is aligned with head 36 of bolt-like member 26 and attaching plate A can be pulled off.

Various changes in the shape, size and arrangement of parts may be made to the form of the invention herein shown and described without departing from the spirit of the invention or the scope of the following claims.

I claim:

1. An anchoring device including an attaching plate having a keyhole slot and attaching means for securing said attaching plate to an anchoring point when said attaching means is registered with the narrower part of said keyhole slot, said attaching means including a head shaped and dimensioned to pass through the larger part of said keyhole slot when aligned therewith and to abut against said attaching plate and retain said attaching plate on said attaching means when said attaching means is registered with the narrower part of said keyhole slot, spacing means for spacing said head from said anchoring point, said spacing means having an external configuration for interfitting within the narrower part of said keyhole slot, and locking means including a leaf spring having a biased end, a projection mounted on said biased end of said leaf spring in juxtaposition for interfitting within the larger part of said keyhole slot when said attaching means is registered with the narrower part of said keyhole slot, a washer, said leaf spring being mounted on said spacing means and positioned between said washer and said head of said attaching means in juxtaposition to provide a fixed portion of said leaf spring from which said spring biased end extends in a cantilevered manner, and said leaf spring includes a substantially flat, circular portion positioned on said spacing means for abutment with said washer, said circular portion of said leaf spring including a lug extending outwardly from the face thereof adjacent said washer, and said washer including a guideway for receiving said lug in orientation of said leaf spring with respect to said washer, and means for mounting said leaf spring on said spacing means for loading of said leaf spring in urging said projection to within the larger part of said keyhole slot and said attaching plate in abutment with said head when said attaching means is registered with the narrower part of said keyhole slot.

2. An anchoring device as specified in claim 1 wherein a pair of guideways for said lug are provided on said washer, one of said guideways selectively receiving said lug and holding said leaf spring in a fixed position against rotation with respect to said washer, and the other of said guideways selectively receiving said lug permitting limited rotational movement of said leaf spring with respect to said washer, said leaf spring being positioned with respect to said washer for interfitting of said lug in the desired guideway.

3. An anchoring device as specified in claim 2 wherein said guideways comprise recesses peripherally provided about said washer.

4. An anchoring device including an attaching plate and a keyhole slot and attaching means for securing said attaching plate to an anchoring point when said attaching means is registered with the narrower part of said keyhole slot, said attaching means including bolt-like member having an elongated shank provided with a head member at one end thereof and including a spacing means adjacent said head member, said head member being shaped and dimensioned to pass through the larger part of said keyhole slot when aligned therewith and to abut against said attaching plate and retain said attaching plate on said attaching means when said attaching means is registered with the narrower part of said keyhole slot, said spacing means having an external configuration for interfitting within the narrower part of said keyhole slot and spacing said head member from the anchoring point, locking means including a leaf spring having a biased end, a projection mounted on said biased end of said leaf spring in juxtaposition for interfitting within the larger part of said keyhole slot when said attaching means is registered with the narrower part of said keyhole slot, said leaf spring including a substantially flat, circular resilient portion and an integral elongated resilient portion, said elongated portion having one end divergently angled from said other resilient portion, said end so divergently angled comprising said biased end of said leaf spring, a washer, said leaf spring being mounted on said spacing means and positioned between said washer and said head of said attaching means in juxtaposition to provide a fixed portion of said leaf spring from which said spring biased end extends in a cantilever manner for loading thereof in urging said projection to within the larger part of said keyhole slot and said attaching plate in abutment with said head when said attaching means is registered with the narrower part of said keyhole slot, said leaf spring including a lug extending outwardly from the face thereof adjacent said washer, said washer including a pair of guideways for selectively receiving said lug in orientation of said leaf spring with respect to said washer, one of said guideways selectively receiving said lug and holding said leaf spring in a fixed position against rotation with respect to said washer, and the other of said guideways selectively receiving said lug and permitting limited rotational movement of said leaf spring with respect to said washer, said leaf spring being positioned with respect to said washer for interfitting of said lug in the desired guideway.

References Cited

UNITED STATES PATENTS

| | | | |
|---|---|---|---|
| 2,704,680 | 3/1955 | Bedford | 287—20.5 |
| 2,853,113 | 9/1958 | Flora et al. | 151—41.75 |

FOREIGN PATENTS

| | | |
|---|---|---|
| 796,191 | 6/1958 | Great Britain. |

BERNARD A. GELAK, *Primary Examiner.*